(12) United States Patent
Sasazaki et al.

(10) Patent No.: US 10,007,173 B2
(45) Date of Patent: Jun. 26, 2018

(54) DISPLAY PROCESSING DEVICE AND PROJECTION TYPE IMAGE DISPLAY DEVICE

(71) Applicant: SONY CORPORATION, Tokyo (JP)

(72) Inventors: Yukihiro Sasazaki, Tokyo (JP); Jun Nishikawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days. days.

(21) Appl. No.: 15/306,929

(22) PCT Filed: Mar. 10, 2015

(86) PCT No.: PCT/JP2015/056932
§ 371 (c)(1),
(2) Date: Oct. 26, 2016

(87) PCT Pub. No.: WO2015/170507
PCT Pub. Date: Nov. 12, 2015

(65) Prior Publication Data
US 2017/0045809 A1    Feb. 16, 2017

(30) Foreign Application Priority Data

May 7, 2014    (JP) .................................. 2014-096325

(51) Int. Cl.
G03B 21/14    (2006.01)
G02B 7/09    (2006.01)
H04N 9/31    (2006.01)
G03B 21/28    (2006.01)
G03B 21/00    (2006.01)

(52) U.S. Cl.
CPC ............. *G03B 21/142* (2013.01); *G02B 7/09* (2013.01); *G03B 21/145* (2013.01); *H04N 9/317* (2013.01); *H04N 9/3179* (2013.01); *G03B 21/005* (2013.01); *G03B 21/147* (2013.01); *G03B 21/28* (2013.01)

(58) Field of Classification Search
CPC ...... G03B 21/005; G03B 21/28; G03B 21/53; G03B 21/145; G03B 21/147; G02B 15/14; G02B 15/16; G02B 15/20; G02B 15/161; G02B 15/163
See application file for complete search history.

(56) References Cited

U.S. PATENT DOCUMENTS 6,592,228 B1 *    7/2003    Kawashima ........... G03B 21/11
                                                                    348/745
8,944,607 B2 *    2/2015    Ichieda ................ H04N 9/3185
                                                                    353/69
(Continued)

FOREIGN PATENT DOCUMENTS

JP        05-040308 A    2/1993
JP    HEI 05-040308 A    2/1993
(Continued)

*Primary Examiner* — Sultan Chowdhury
(74) *Attorney, Agent, or Firm* — Chip Law Group

(57) ABSTRACT

A display processing device includes a focus control unit configured to control a focal length in at least a central area of a projection image in accordance with a user operation, the projection image being enlarged and projected from a projection optical system capable of setting the focal length of the projection image at a short range.

11 Claims, 15 Drawing Sheets

(56) References Cited

U.S. PATENT DOCUMENTS

| | | | | |
|---|---|---|---|---|
| 2003/0071975 | A1* | 4/2003 | Fujimori | H04N 9/3141 353/31 |
| 2005/0094112 | A1* | 5/2005 | Eguchi | H04N 9/317 353/111 |
| 2006/0285089 | A1* | 12/2006 | Higashi | G03B 21/53 353/101 |
| 2009/0225445 | A1* | 9/2009 | Sueyoshi | G02B 7/08 359/793 |
| 2010/0194853 | A1* | 8/2010 | Matsusaka | G02B 13/06 348/36 |
| 2012/0249979 | A1* | 10/2012 | Morikuni | G02B 17/0896 353/70 |
| 2013/0335713 | A1* | 12/2013 | Zhu | G03B 21/00 353/98 |

FOREIGN PATENT DOCUMENTS

| | | |
|---|---|---|
| JP | 2000-081601 A | 3/2000 |
| JP | 2006-246502 A | 9/2006 |
| JP | 2012-247524 A | 12/2012 |
| JP | 2013-003369 A | 1/2013 |
| JP | 2013-171152 A | 9/2013 |
| JP | 2013-239835 A | 11/2013 |
| JP | 2014-027651 A | 2/2014 |
| JP | 2014-032402 A | 2/2014 |

* cited by examiner

L1: DISTANCE FROM PROJECTION SURFACE TO REAR SURFACE OF MAIN BODY
L2: DISTANCE FROM PROJECTION SURFACE TO FRONT SURFACE OF MAIN BODY
D1: MAXIMUM SCREEN SIZE
D2: MINIMUM SCREEN SIZE
H1: DISTANCE FROM FLOOR TO LOWER END OF SCREEN D1
H2: DISTANCE FROM FLOOR TO LOWER END OF SCREEN D2

FIG. 10

| | SCREEN SIZE | | | | | | | INSTALLATION DISTANCE | |
|---|---|---|---|---|---|---|---|---|---|
| | MAXIMUM | | | | MINIMUM | | | DISTANCE L1 FROM PROJECTION SURFACE TO REAR SURFACE PORTION | DISTANCE L2 FROM PROJECTION SURFACE TO FRONT SURFACE PORTION |
| | DIAGONAL D1 | WIDTH × HEIGHT | LOWER END DISTANCE H1 | | DIAGONAL D2 | WIDTH × HEIGHT | LOWER END DISTANCE H2 | | |
| WHEN PROJECTING ON MAXIMUM SCREEN | 147 INCH | 3.30m × 1.74m | 45cm | | 92 INCH | 2.07m × 1.09m | 57cm | 17cm | 70.5cm |
| INTERMEDIATE POSITION | 127 INCH | 2.84m × 1.50m | 41cm | | 79 INCH | 1.78m × 0.94m | 51cm | 8.5cm | 62.0cm |
| WHEN INSTALLING AT MINIMUM DISTANCE | 106 INCH | 2.39m × 1.26m | 38cm | | 66 INCH | 1.49m × 0.79m | 46cm | 0cm | 53.5cm |

EQUATION 1 (CALCULATE INSTALLATION DISTANCE FROM SCREEN SIZE)　　　UNIT: cm

| MAXIMUM SCREEN SIZE | MINIMUM SCREEN SIZE |
|---|---|
| L1= 0.1857×W1−44.3090 | L1= 0.2964×W2−44.2027 |
| L2= 0.1857×W1+9.1910 | L2= 0.2964×W2+9.2973 |

EQUATION 2 (CALCULATE SCREEN SIZE FROM INSTALLATION DISTANCE)　　　UNIT: cm

| FROM PROJECTION SURFACE TO REAR SURFACE PORTION | FROM PROJECTION SURFACE TO FRONT SURFACE PORTION |
|---|---|
| W1= 5.3850×L1+238.6644 | W1= 5.3850×L2−49.4932 |
| W2= 3.3734×L1+149.1119 | W2= 3.3734×L2−31.3627 |

EQUATION 3 (CALCULATE DISTANCE FROM FLOOR TO LOWER END OF PROJECTION SCREEN)　　　UNIT: cm

| MAXIMUM SCREEN SIZE | MINIMUM SCREEN SIZE |
|---|---|
| H1= 0.0798×W1+18.6804 | H2= 0.1830×W2+18.8798 |

DISPLAY PROCESSING DEVICE AND PROJECTION TYPE IMAGE DISPLAY DEVICE

CROSS REFERENCE TO RELATED APPLICATIONS

This application is a U.S. National Phase of International Patent Application No. PCT/JP2015/056932 filed on Mar. 10, 2015, which claims priority benefit of Japanese Patent Application No. JP 2014-096325 filed in the Japan Patent Office on May 7, 2014. Each of the above-referenced applications is hereby incorporated herein by reference in its entirety.

TECHNICAL FIELD

The present disclosure relates to display processing devices and projection type image display devices.

BACKGROUND ART

In recent years, projector devices have been widely known as a projection type image display device that displays a projection image on a projection surface such as a screen or the like. Specifically, in recent years, there has been a growing demand for ultra-wide-angle front projection type projector devices capable of displaying wide-screen images while narrowing a projection space. The ultra-wide-angle front projection type projector device is capable of setting a focal length of a projection image at a short range (hereinafter, such a projector device may be referred to as a "short focus projector device"). In the case of using the short focus projector device, it is possible to display a wide-screen image in a limited space by projecting the wide-angle image obliquely with respect to a projection surface.

In general, the projector device is used after adjusting a projection image quality to an optimum state when installing the projector device or changing a screen size, for example. Patent Literature 1 listed below describes that a projected image from an ultra-short range projector (short focus projector device) is especially sensitive to small positioning adjustments of a projector installing position. Therefore, Patent Literature 1 discloses a technology for identifying information to facilitate adjusting the position of a projector.

CITATION LIST

Patent Literature

Patent Literature 1: JP 2014-32402A

SUMMARY OF INVENTION

Technical Problem

However, since the short focus projector device has a large projection angle to a projection surface and has an ultra wide angle of view, it is difficult for a user to adjust a position of a focus lens that adjust a focal length of a projection image. If the user can adjust not only the position of the projector as described in Patent Literature 1 but also the focal length of the projection image in the short focus projector device, projection images having more optimum screen size and image quality can be obtained.

Accordingly, the present disclosure proposes a novel and improved display processing device and projection type image display device that are capable of adjusting a focal length of a projection image in accordance with a user operation even in the case of a short focus projector device.

Solution to Problem

According to the present disclosure, there is provided a display processing device including a back focus control unit configured to control a focal length in at least a central area of a projection image in accordance with a user operation, the projection image being enlarged and projected from a projection optical system capable of setting the focal length of the projection image at a short range.

According to the present disclosure, there is provided a projection type image display device including: a light source; an illumination optical system configured to uniformly radiate light flux from the light source to a surface of an image modulation element serving as a primary image surface; a projection optical system configured to be capable of setting a focal length of a projection image at a short range, and configured to enlarge and project image information of the primary image surface modulated by the image modulation element on a projection surface serving as a secondary image surface; and a back focus control unit configured to control a focal length in at least a central area of the projection image in accordance with a user operation.

Advantageous Effects of Invention

As described above, according to the present disclosure, it is possible to adjust a focal length of a projection image in accordance with a user operation even in the case of a short focus projector device.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 10 is an explanatory diagram illustrating screen sizes and installation distances that are referred to when a short focus projector device is installed.

DESCRIPTION OF EMBODIMENT(S)

Figure 1:
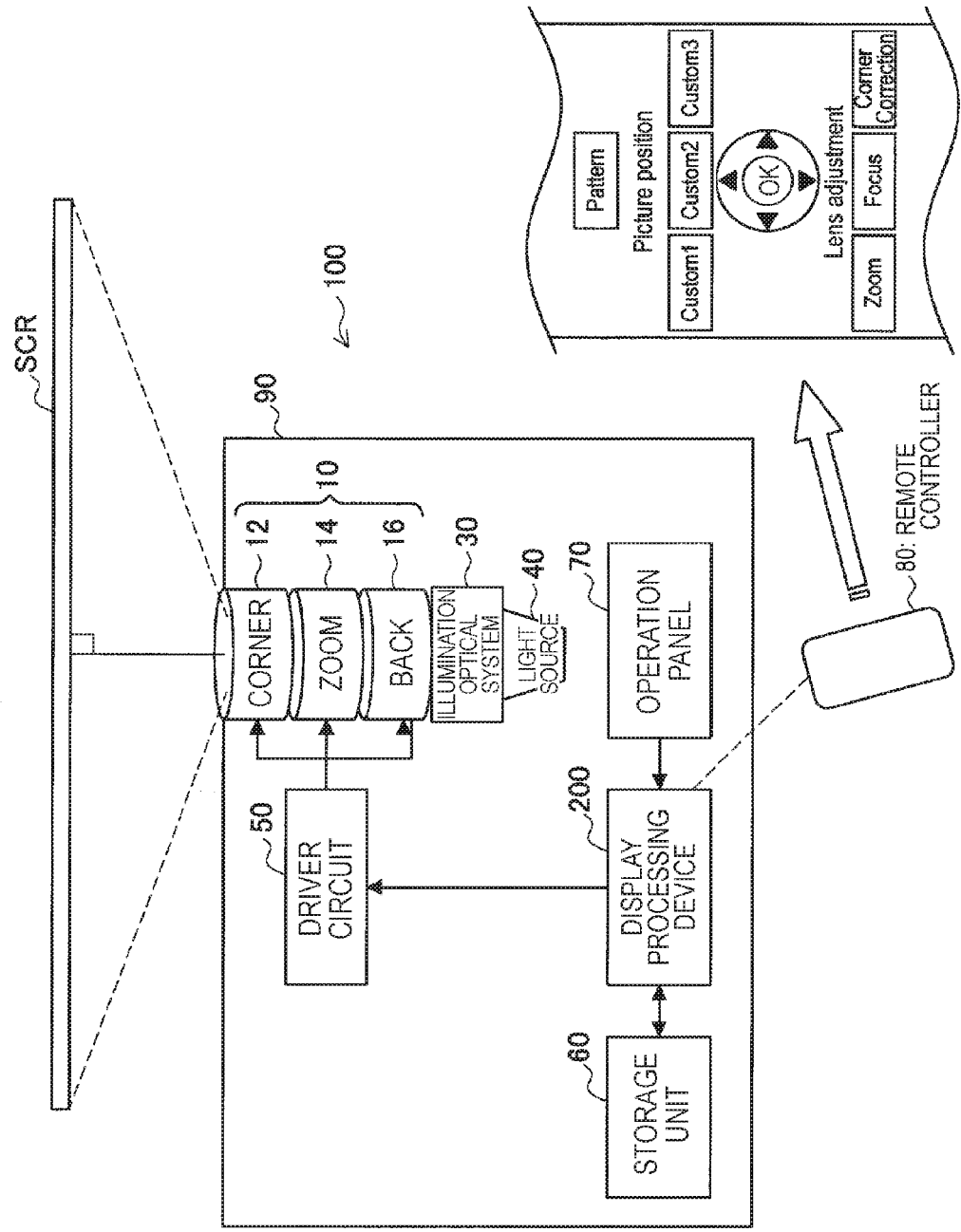
FIG. 1 is an explanatory diagram illustrating a schematic configuration example of a short focus projector device according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that the description is given in the following order.
1. Overview of projection type image display device
2. Schematic configuration example of short focus projector device
3. Configuration example of projection optical system
4. Configuration example of display processing device
4.1. Zoom control unit
4.2. Back focus control unit
4.3. Corner focus control unit
5. Example of image quality adjustment procedure
6. Conclusion

1. Overview of Projection Type Image Display Device

First, overview of a projection type image display device according to a first embodiment of the present disclosure will be briefly described by using a short focus projector device as an example.

The short focus projector device is an example of a projection type image display device that can project a wide-angle image obliquely with respect to a projection surface from an upper side or a lower side, and display a wide screen video on the projection surface. The short focus projector device can set a focal length of a projection image at a short range, and can be installed near the projection surface. This enables wide screen display in a limited space.

The short focus projector device is installed on a ceiling or floor near the projection surface so as not to interrupt the projection image that a viewer sees. In the case of projecting a wide-angle projection image obliquely with respect to the projection surface, distances from a lens of the short focus projector device differ according to positions in the screen. For example, in the case where the short focus projector device installed on the floor is used, a distance from the lens to a lower side of an image frame is greatly different from a distance from the lens to an upper side of the image frame. Therefore, it is difficult for a user to optimize the image quality by adjusting focal lengths in the whole image.

When the lens in the optical system of the short focus projector device is designed, a focal position at the time of changing an enlargement ratio of the projection image is constant regardless of an enlarging side or reducing side. On the other hand, when the lens is manufactured, sensitivity to the focal position is different between the image size enlarging side and reducing side. Therefore, when actually using the short focus projector device, it is necessary to make it possible to adjust the focal positions of the projection image to the same position on an optical axis. In addition, a refractive index of the lens or linear expansion of component parts may change due to change in temperature or the like of a room where the short focus projector device is installed. In this case, the focal position also changes. Therefore, a function of correcting a focal length of the projection image is necessary.

In addition, in the short focus projector device, the enlargement ratio of the projection image and focal lengths in a central area and an outer area of the projection image are associated with each other. Therefore, it is difficult for a user to adjust all the settings by him/herself. For the reasons described above, the short focus projector device according to the present disclosure is configured to allow a user to easily adjust the focal lengths.

The short focus projector device modulates light emitted from a light source including a light-emitting device such as a laser diode (LD), a high-pressure mercury lamp, or the like, by using a liquid crystal display device, a digital micromirror device (DMD), or the like serving as an image modulation element, to form an optical image according to video signals. The short focus projector device enlarges and projects the formed optical image by using the projection optical system, and displays the formed optical image on the projection surface. As the short focus projector device, a so-called three-CCD short focus projector device including panel-shaped display elements corresponding to respective colors of red (R), green (G), and blue (B) has been widely known.

For example, the short focus projector device according to the present disclosure may have a projection optical system that supports an ultra wide angle near 70° in a half angle of view.

2. Schematic Configuration Example of Short Focus Projector Device

Next, a schematic configuration of a short focus projector device according to the present embodiment will be described. FIG. 1 is an explanatory diagram illustrating a schematic configuration example of a short focus projector device 100 according to the present embodiment. As illustrated in FIG. 1, the short focus projector device 100 includes a light source 40, an illumination optical system 30, and a projection optical system 10 in a housing 90. The short focus projector device 100 further includes an operation panel 70, a display processing device 200, a storage unit 60, and a driver circuit 50. In addition, the short focus projector device 100 includes an accompanying remote controller 80 by which a user performs an operation.

For example, the light source 40 includes the LD, the high-pressure mercury lamp, or the like, and emits light flux to the illumination optical system 30.

The illumination optical system 30 uniformly radiates the light flux from the light source 40 to a surface of the image modulation element (liquid crystal panel) serving as a primary image surface. Specifically, in the illumination optical system 30, the light flux emitted from the light source 40 passes through first and second fly eye lenses, a polarization conversion element, and a condenser lens. The light flux passed through them is separated into R color component light, B color component light, and C color component light, by dichroic mirrors each of which reflects light of a specific wavelength band only. The R color component light, B color component light, and C color component light are incident on liquid crystal panels corresponding to respective colors of R, G, and B by using a total reflection mirror, lens, or the like. Subsequently, after the light modulation according to video signals is performed by each of the liquid crystal panels, the respective color component light after the light modulation are combined by a dichroic prism, and emitted to the projection optical system 10.

The liquid crystal panel may be any of a transmissive liquid crystal panel or a reflective liquid crystal panel. As the image modulation element, the digital micromirror device (DMD) can be used instead of the liquid crystal panel. In addition, instead of the dichroic prism, a polarization beam splitter (PBS), a color combining prism that combines video signals of R, G, and B colors, a total internal reflection (TIR) prism, or the like can be used.

The projection optical system 10 receives the light emitted from the illumination optical system 30, and enlarges and projects image information of a primary image surface modulated by the liquid crystal panel of the illumination optical system 30 on a projection surface SCR serving as a secondary image surface. The projection optical system 10 includes a corner focus lens 12, a zoom lens 14, and a back focus lens 16.

3. Configuration Example of Projection Optical System

Next, a specific configuration of the projection optical system 10 used for adjusting a focus and the enlargement ratio of the projection image will be described.

Figure 2:
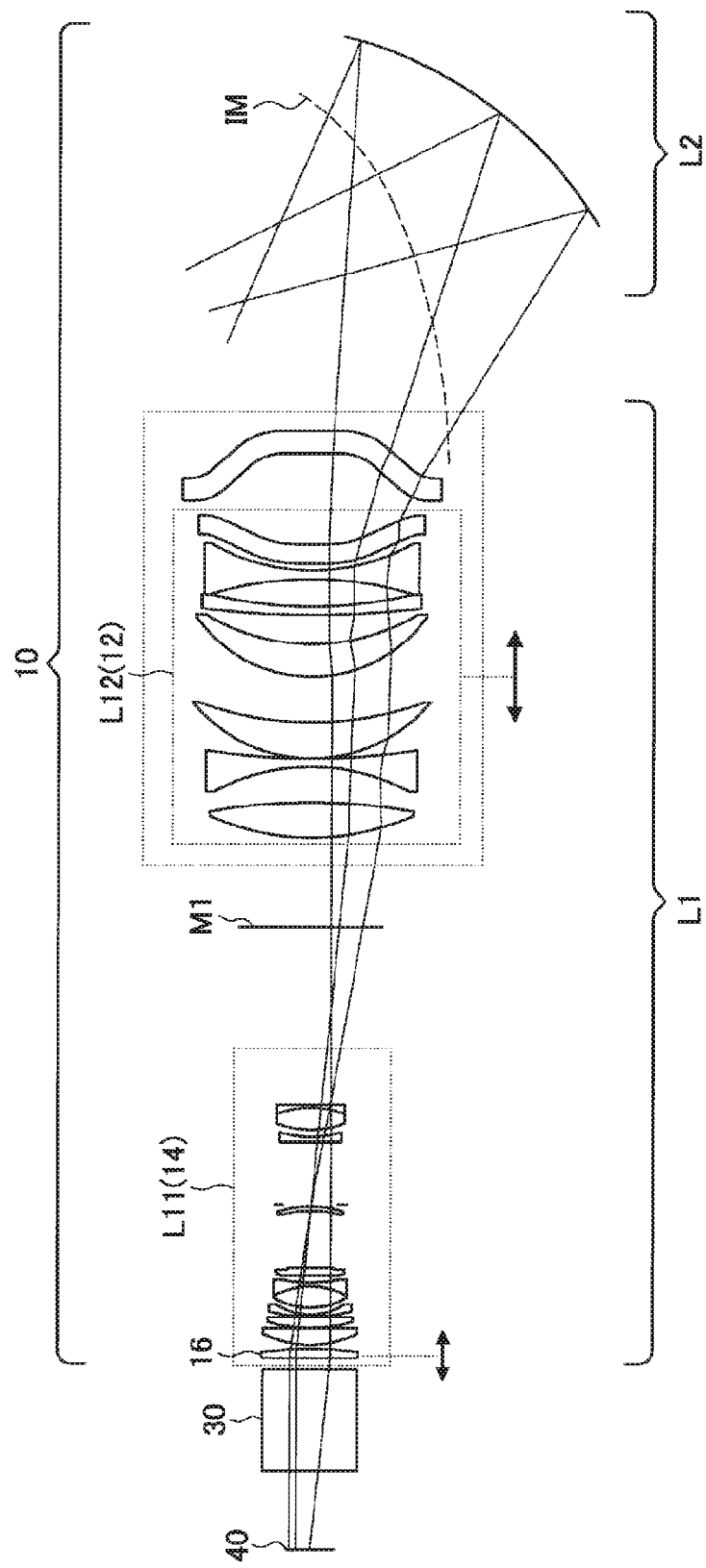
FIG. 2 is an explanatory diagram illustrating a projection optical system in a short focus projector device according to the embodiment.

FIG. 2 is a ray diagram illustrating a schematic configuration example of the projection optical system 10 according to the present embodiment. As illustrated in FIG. 2, the projection optical system 10 includes a first optical system L1 having positive refractive power, and a second optical system L2 having a concave surface reflection surface. In the first optical system L1, all optical components constituting the first optical system L1 share an optical axis that has a rotation target surface. The second optical system L2 includes a curved surface reflection surface, and shares the optical axis with the first optical system L1. The projection optical system 10 having the first optical system L1 and the second optical system L2 enlarges and projects an image on the secondary image surface at the enlarging side from the primary image surface at the reducing side. In other words, the projection optical system 10 enlarges and projects image information of the primary image surface formed by the illumination optical system 30, on the projection surface SCR serving as the secondary image surface.

In the first optical system L1 of the projection optical system 10 having the above described configuration, an optical system L11 having positive refractive power and an optical system L12 having negative refractive power are arranged in this order from the primary image surface side. Subsequently, the light flux emitted from the first optical system L1 is incident on the second optical system L2 once an intermediate image IM is formed between the first optical system L1 and the second optical system L2. In FIG. 2, a first plane reflection surface should be disposed at M1. However, in FIG. 2, a dummy surface is disposed at M1 for convenience.

In the first optical system L1, the optical system L12 has a function as the corner focus lens 12 that adjusts a focal length (hereinafter, also referred to as a "corner focus") in a corner area of the projection image. Since a part of a lens group of the optical system L12 moves back and forth along the optical axis, it is possible to adjust the focal length in the corner area of the image frame of the projection image. The adjustment of the focal length in the corner area of the projection image may mean adjustment of a focal length in the outer area of the projection image. A position of the corner focus lens 12 can be moved by a corner focus lens driving motor controlled by the display processing device 200, for example. In addition, the position of the corner focus lens 12 can be detected by a corner focus potentiometer (not illustrated), for example. The short focus projector device 100 according to the present embodiment is used after installing it on the floor. The corner focus lens 12 is mainly used for adjusting focal lengths in corner areas at an upper side of the image frame.

In the first optical system L1, the optical system L11 has a function as the zoom lens 11 that adjusts the enlargement ratio (hereinafter, also referred to as "zoom") of the projection image. The enlargement ratio of the projection image can be adjusted by changing intervals between lens groups constituting the optical system L11. In addition, in the projection optical system 10 according to the present disclosure, the optical system L11 moves in direction perpendicular to the optical axis in accordance with the enlargement ratio of the projection image. This enables shift adjustment of a height position of the projection image. For example, a position of the zoom lens 14 can be moved by a zoom lens driving motor controlled by the display processing device 200. In addition, the position of the zoom lens 14 can be detected by a zoom potentiometer (not illustrated), for example.

Figure 3:
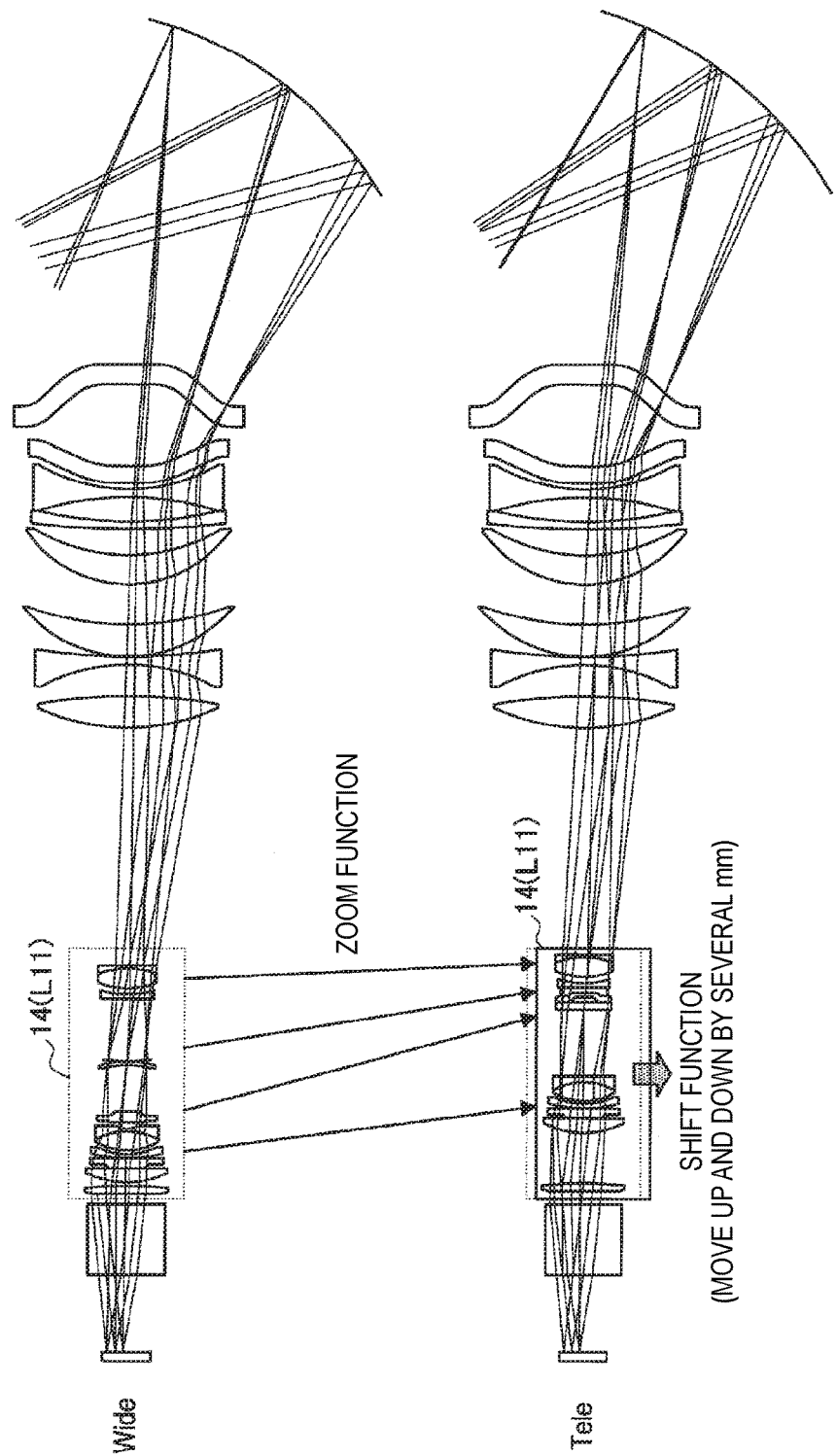
FIG. 3 is an explanatory diagram illustrating states of a zoom lens during zoom adjustment.
Figure 4:
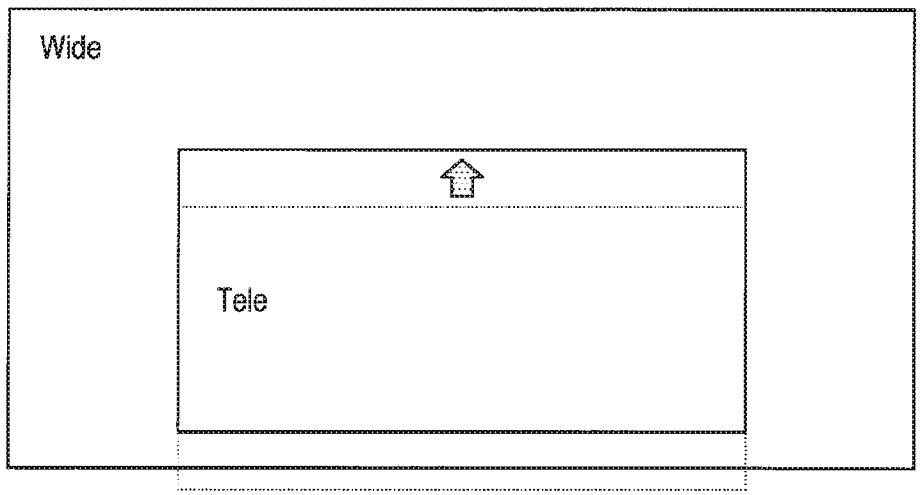
FIG. 4 is an explanatory diagram illustrating shift adjustment associated with zoom adjustment.

FIG. 3 and FIG. 4 are each an explanatory diagram illustrating an operation and a function of the zoom lens 14 of the projection optical system 10 according to the present embodiment. The upper side of FIG. 3 illustrates a state of the projection optical system 10 when the enlargement ratio of the projection image is set to the maximum (wide). The lower side of FIG. 3 illustrates a state of the projection optical system 10 when the enlargement ratio of the projection image is set to the minimum (tele). As illustrated in FIG. 3, when the wide enlargement ratio and the tele enlargement ratio of the projection image are compared, the lens intervals of the zoom lens 14 are different, and the height position of the zoom lens 14 is shifted. Thereby, as illustrated in FIG. 4, it is possible to prevent the projection image from being shifted to the lower side, and it is also possible to display the projection image at an appropriate position when the enlargement ratio of the projection image set to the tele state.

In addition, the optical system L11 includes the back focus lens 16 that adjusts the focal length (hereinafter, also referred to as a "back focus") in the central area of the projection image. In the lens group of the optical system L11, the back focus lens 16 is positioned at the illumination optical system 30 side. The back focus of the projection image can be adjusted by moving the back focus lens 16 back and forth in the optical axis direction. A position of the back focus lens 16 can be moved by a back focus lens driving motor controlled by the display processing device 200, for example. In addition, the position of the back focus lens 16 can be detected by a back focus potentiometer (not illustrated), for example.

4. Configuration Example of Display Processing Device

Figure 5:
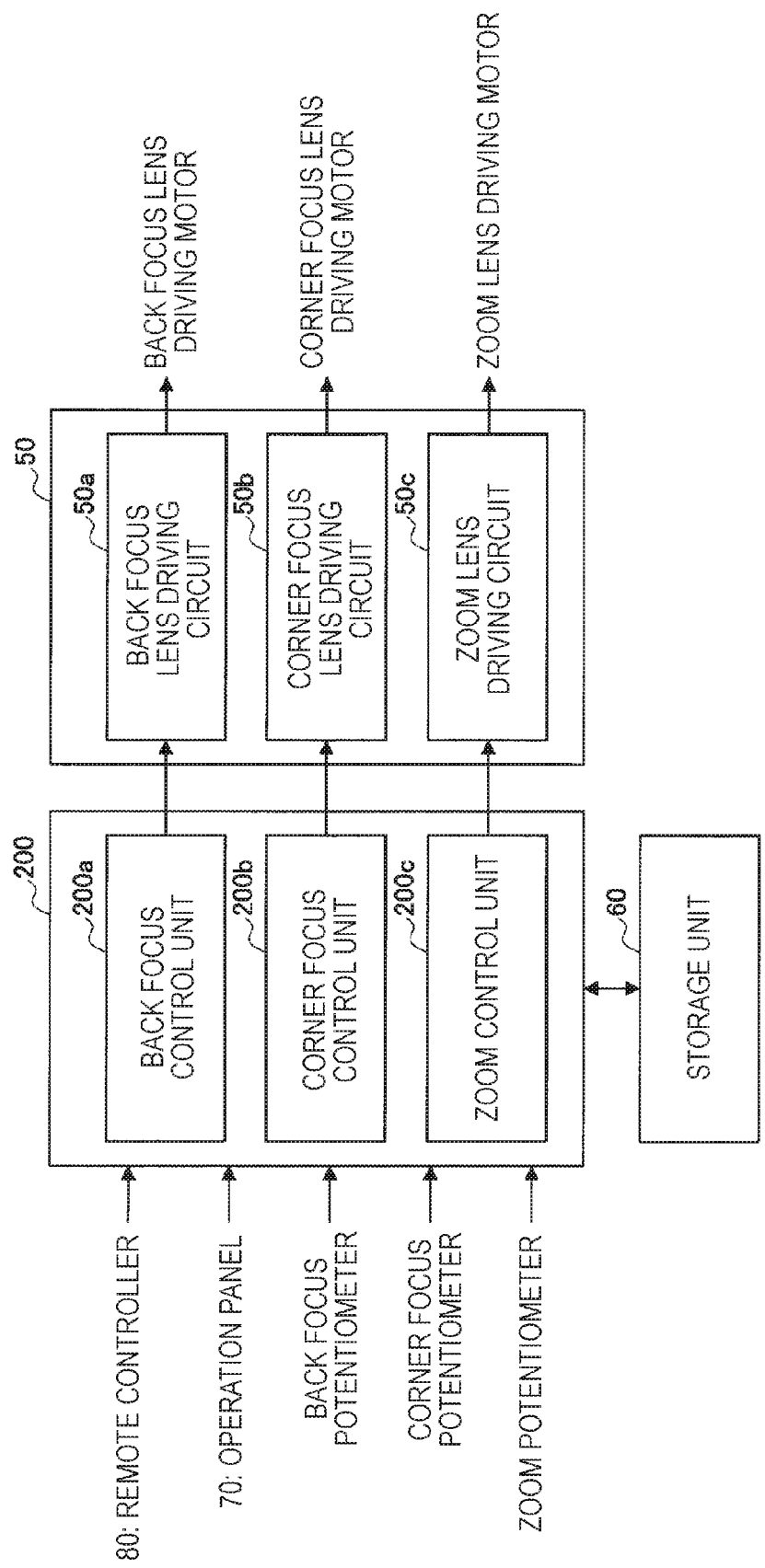
FIG. 5 is an explanatory diagram illustrating a configuration example of a display processing device according to the embodiment.

Next, a configuration example of the display processing device 200 that controls the projection optical system 10 will be described. FIG. 5 is an explanatory diagram illustrating the configurations of the display processing device 200 and the driver circuit 50 by using functional blocks. The display processing device 200 according to the present embodiment includes a back focus control unit 200a, a corner focus control unit 200b, and a zoom control unit 200c. Specifically, the respective control units are functions achieved by a microcontroller or the like executing a program. To the display processing device 200, operation signals of the remote controller 80 and the operation panel 70, and detection signals of the back focus potentiometer, the corner focus potentiometer, and the zoom potentiometer are input. The driver circuit 50 includes a back focus lens driving circuit 50a, a corner focus lens driving circuit 50b, and a zoom lens driving circuit 50c.

As illustrated in FIG. 1, the remote controller 80 by which the display processing device 200 according to the present embodiment is operated includes three preset buttons of "Custom1", "Custom2", and "Custom3" with regard to "Picture Position". The number of the preset buttons may be one, two, or four or more. A position of the corner focus lens 12, a position of the zoom lens 14, and a position of the back focus lens 16 are related to the three preset buttons of "Custom1", "Custom2", and "Custom3", respectively, and stored in the storage unit 60 in advance. In the present embodiment, the lens position is expressed as a potentio value of the potentiometer. Therefore, when a user selects a preset button corresponding to a desired projection screen size, the back focus control unit 200a, the corner focus control unit 200b, and the zoom control unit 200c read corresponding preset values from among a stored preset value group.

The preset value group called by the preset buttons does not have to be stored in advance. It is also possible for a user himself/herself to store a combination of a position of a corner focus lens 12, a position of a zoom lens 14, and a position of the back focus lens 16 that are frequently used, in the storage unit 60. This enables easy image quality adjustment when displaying an image having a frequently used screen size.

The remote controller 80 also includes three image quality adjustment buttons of "Zoom", "Focus", and "Corner Correction" with respect to "Lens Adjustment". In addition, the remote controller 80 includes arrow buttons and an image quality adjustment pattern display button of "Pattern". Functions of such operation buttons provided on the remote controller 80 can be selected also by using the operation panel 70.

[4.1. Zoom Control Unit]

The zoom control unit 200c outputs a zoom-lens-driving-motor driving command for the zoom lens driving circuit 50c. The zoom control unit 200c in the display processing device 200 according to the present embodiment is capable of adjusting the enlargement ratio of the projection image in accordance with a user operation. The zoom control unit 200c is capable of automatically adjusting the enlargement ratio of the projection image in accordance with a preset value linked to a preset button selected by a user from among a plurality of preset buttons set in advance.

The user can adjust the enlargement ratio of the projection image by operating the remote controller 80 or the operation panel 70. For example, in the case where the enlargement ratio of the projection image is automatically adjusted using a preset value, the user selects a preset button of the remote controller 80 or the operation panel 70 in accordance with a desired projection screen size. Accordingly, to the zoom lens driving circuit 50c, the zoom control unit 200c outputs a driving command to move the zoom lens 14 to a position set in advance.

When the user selects the Zoom button by using the remote controller 80 or the operation panel 70, the enlargement ratio of the projection image can be adjusted by the operation input by the user. In this case, the user operates arrow buttons on the remote controller 80 or the operation panel 70, and the zoom control unit 200c outputs a driving command for the zoom lens driving circuit 50c in accordance with the input.

As described above, in the short focus projector device 100 according to the present embodiment, the enlargement ratio of the projection image can be adjusted by an operation input by the user after a preset button is pressed and the enlargement ratio is automatically adjusted. Therefore, the user can adjust the screen size of the projection image relatively easily. Such adjustment of the enlargement ratio of the projection image may be performed while the pattern image that is displayed by pressing the image quality adjustment pattern display button of "Pattern" is being displayed.

[4.2. Back Focus Control Unit]

The back focus control unit 200a outputs a back-focus-lens-driving-motor driving command for the back focus lens driving circuit 50a. The back focus control unit 200a in the display processing device 200 according to the present embodiment is capable of adjusting the back focus in accordance with an operation input by the user. The back focus control unit 200a can automatically adjust the back focus in accordance with user's selection from a plurality of preset values set in advance. In addition, the back focus control unit 200a can automatically adjust the back focus on the basis of a current enlargement ratio of the projection image.

The user can adjust the back focus by operating the remote controller 80 or the operation panel 70. For example, in the case where the back focus is automatically adjusted using a preset value, the user selects a preset button of the remote controller 80 or the operation panel 70 in accordance with a desired projection screen size. Thereby, the back focus is automatically adjusted on the basis of the preset value in a way similar to the automatic adjustment of the enlargement ratio of the projection image. Specifically, the back focus control unit 200a outputs a driving command for the back focus lens driving circuit 50a to move the back focus lens 16 to a position corresponding to the selected preset button.

When the user selects the Focus button using the remote controller 80 or the operation panel 70, the back focus control unit 200a reads a zoom potentio value indicating a current position of the zoom lens 14. In addition, the back focus control unit 200a calculates a back focus potentio value that indicates a position of the back focus lens 16 according to a position of the zoom lens 14. Subsequently, the back focus control unit 200a outputs a driving command for the back focus lens driving circuit 50a to move the back focus lens 16 to the calculated position.

Figure 6:
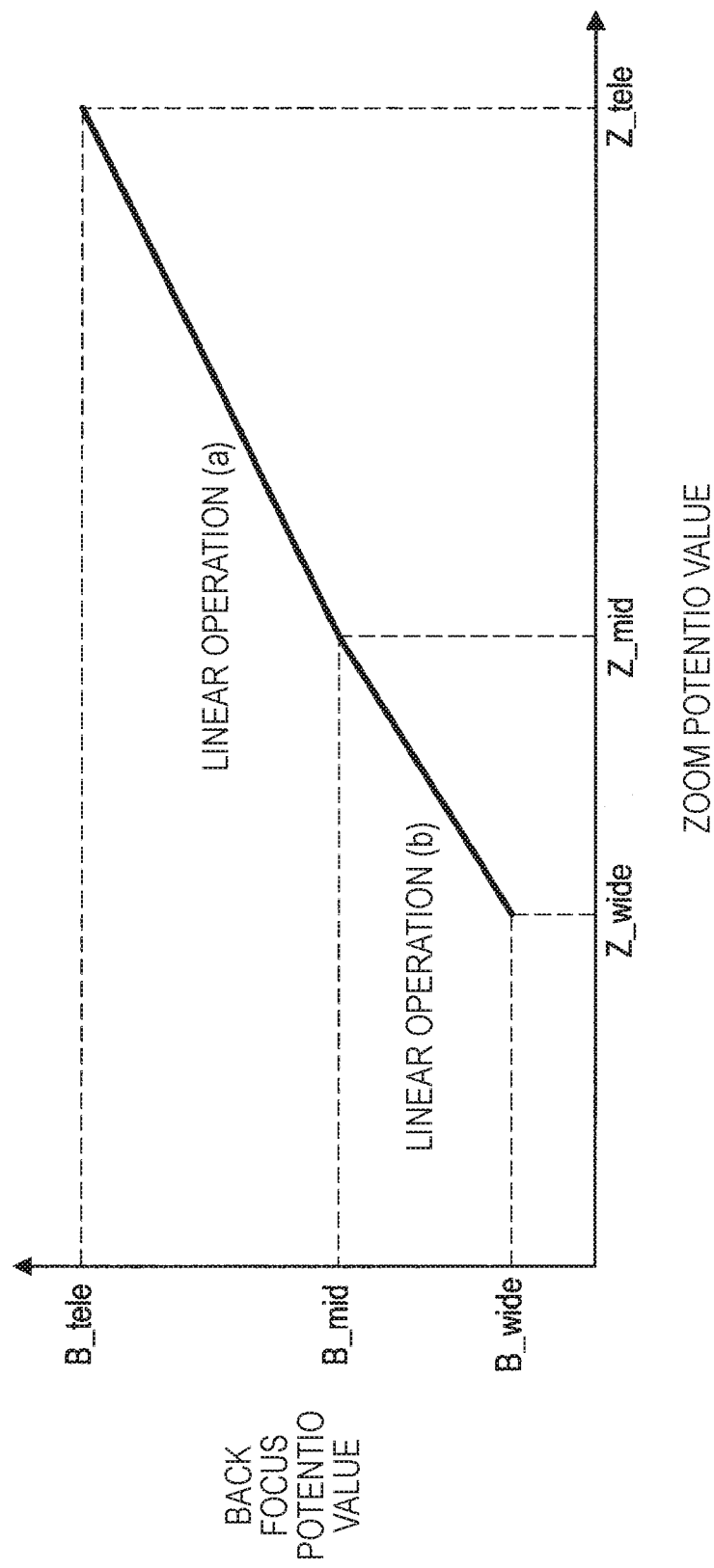
FIG. 6 is a diagram illustrating linear operation of back focus potentio values during automatic back focus adjustment.

FIG. 6 is an explanatory diagram illustrating an example of a method of finding a position of the back focus lens 16 according to a position of the zoom lens 14 in the display processing device 200 according to the present embodiment. In the present embodiment, the storage unit 60 stores optimum values B_wide, B_mid, and B_tele that are the back focus potentio values corresponding to the zoom potentio values of three reference enlargement ratios Z_wide, Z_mid, and Z_tele of the projection image, in advance. If a read current zoom potentio value is in between two reference positions Z_tele and Z_mid, a corresponding back focus potentio value is calculated using a linear operation (a). In a linear operation (a) area, a back focus potentio value (y1) corresponding to a detected zoom potentio value (x1) is calculated from the formula (1).

[Math. 1]

$$y1 = \frac{B\_tele - B\_mid}{Z\_tele - Z\_mid} x1 + \frac{B\_mid * Z\_tele - B\_tele * Z\_mid}{Z\_tele - Z\_mid} \quad (1)$$

If a read current zoom potentio value is in between two reference positions Z_mid and Z_wide, a corresponding back focus potentio value is calculated using a linear operation (b). In a linear operation (b) area, a back focus potentio value (y2) corresponding to a detected zoom potentio value (x2) is calculated from the formula (2).

[Math. 2]

$$y2 = \frac{B\_mid - B\_wide}{Z\_mid - Z\_wide} x2 + \frac{B\_wide * Z\_mid - B\_mid * Z\_wide}{Z\_mid - Z\_wide} \quad (2)$$

In the present embodiment, the linear operation is carried out on the basis of back focus potentio values corresponding to zoom potentio values of the three reference enlargement ratios. However, the number of the reference enlargement ratios may be two or four or more.

In the display processing device 200 according to the present embodiment, the user selects the Focus button, automatic adjustment of a position of the back focus lens 16 based on the current position of the current zoom lens 14 is finished, and thereby adjustment of the back focus according to the operation input by the user is allowed. Therefore, after the automatic adjustment of the back focus, the user operates arrow buttons on the remote controller 80 or the operation panel 70, and the back focus control unit 200a outputs a driving command for the back focus lens driving circuit 50a in accordance with the input.

As described above, in the short focus projector device 100 according to the present embodiment, the back focus can be adjusted by an operation input by the user after the back focus is automatically adjusted by pressing a preset button and the Focus button, or the Focus button alone. Therefore, the user can adjust the back focus of the projection image relatively easily. As a result, the image quality of the projection image is easily set to the optimum state. Such adjustment of the back focus may be performed while the pattern screen that is displayed by pressing the image quality adjustment pattern display button of "Pattern" is being displayed.

[4.3. Corner Focus Control Unit]

The corner focus control unit 200b outputs a corner-focus-lens-driving-motor driving command for the corner focus lens driving circuit 50b. The corner focus control unit 200b in the display processing device 200 according to the present embodiment is capable of adjusting the corner focus in accordance with an operation input by the user. The corner focus control unit 200b can automatically adjust the corner focus in accordance with user's selection from a plurality of preset values set in advance.

The user can adjust the corner focus by operating the remote controller 80 or the operation panel 70. For example, in the case where the corner focus is automatically adjusted using a preset value, the user selects a preset button of the remote controller 80 or the operation panel 70 in accordance with a desired projection screen size. Thereby, the corner focus is automatically adjusted on the basis of the preset value in a way similar to the automatic adjustment of the enlargement ratio of the projection image or the back focus. Specifically, the corner focus control unit 200b outputs a driving command for the corner focus lens driving circuit 50b to move the corner focus lens 12 to a position corresponding to the selected preset button.

When the user selects the Corner Correction button using the remote controller 80 or the operation panel 70, the corner focus can be adjusted by the operation input by the user. In this case, the user operates arrow buttons on the remote controller 80 and the operation panel 70, and the corner focus control unit 200b outputs a driving command for the corner focus lens driving circuit 50c in accordance with the input.

As described above, in the short focus projector device 100 according to the present embodiment, the corner focus can be adjusted by an operation input by the user after the corner focus is automatically adjusted by pressing a preset button. Therefore, the user can adjust the corner focus of the projection image relatively easily. As a result, the image quality of the projection image is easily set to the optimum state. Such adjustment of the corner focus may be performed while the pattern screen that is displayed by pressing the image quality adjustment pattern display button of "Pattern" is being displayed.

5. Example of Image Quality Adjustment Procedure

Figure 7:
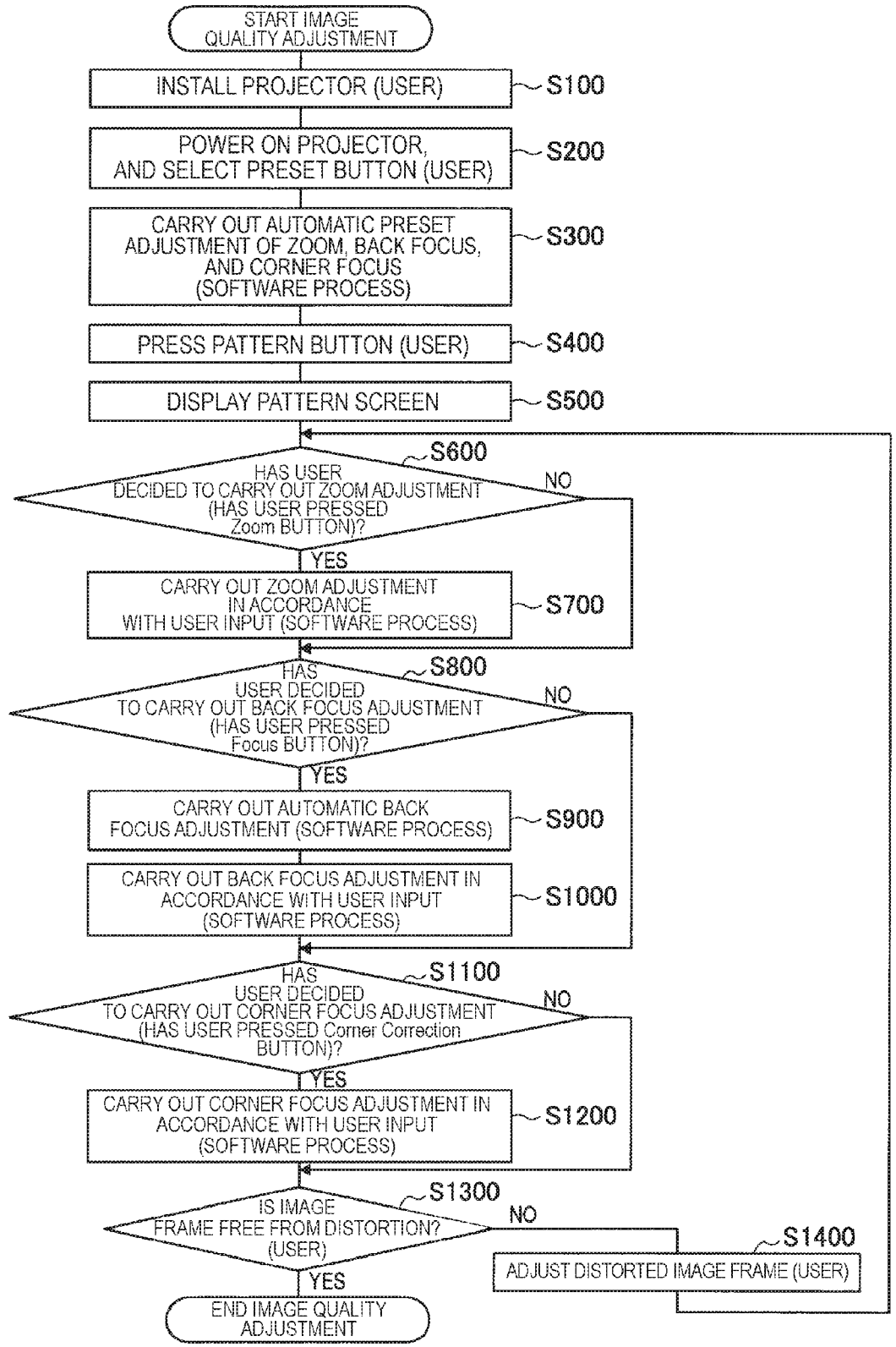
FIG. 7 is a flowchart illustrating an image quality adjustment procedure in a short focus projector device according to the embodiment.

Next, an example of the image quality adjustment procedure in the short focus projector device 100 will be described. FIG. 7 is a flowchart illustrating an example of the image quality adjustment procedure. The image quality adjustment procedure described below is an example of a procedure performed when installing the short focus projector device 100.

Figure 8:
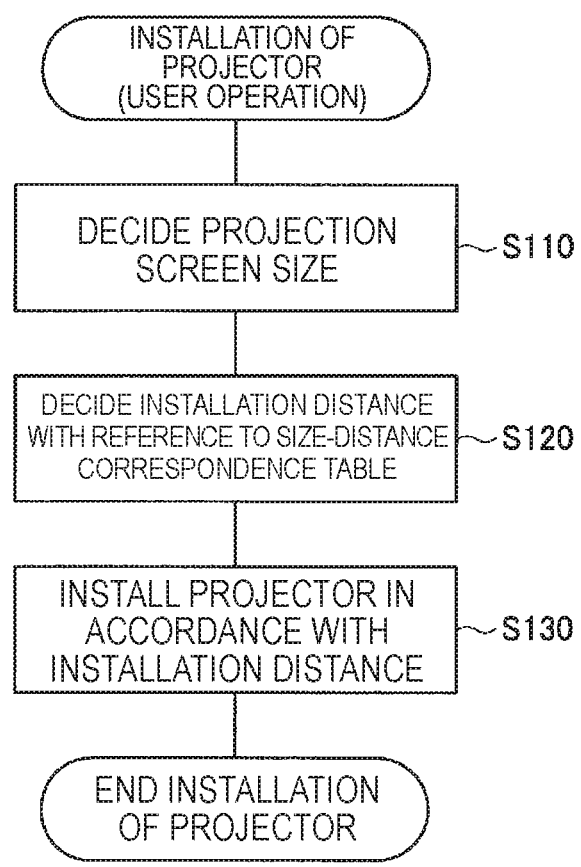
FIG. 8 is a flowchart illustrating an example of a procedure performed by a user to install a short focus projector device.
Figure 9:
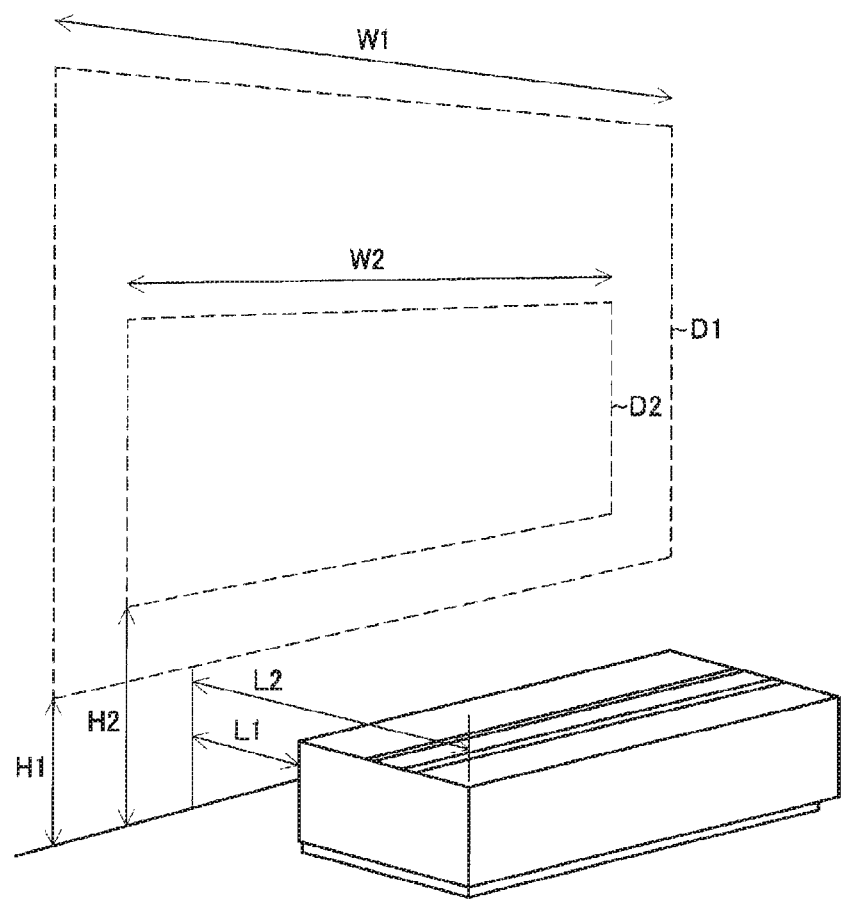
FIG. 9 is an explanatory diagram illustrating screen sizes and respective distances that are referred to when a short focus projector device is installed.

First, in Step S100, the user installs the short focus projector device 100 in a predetermined position. FIG. 8 illustrates an example of a procedure of installing the short focus projector device 100. When installing the short focus projector device 100, the user first decides a projection screen size in accordance with a size of the projection surface SCR or the like in Step S110. Next, in Step S120, the user decides an installation distance of the short focus projector device 100 from the projection surface SCR in accordance with the projection screen size. At this time, the user may decide the installation distance with reference to information on the installation distance of the short focus projector device 100 suitable to the projection screen size illustrated in FIG. 9 and FIG. 10. Next, in Step S130, the user installs the short focus projector device 100 in accordance with the installation distance. Thereby, the installation of the short focus projector device 100 is completed.

With reference to FIG. 7 again, after the installation of the short focus projector device 100 is completed, the user powers on the short focus projector device 100, and then select the preset button "Custom1", "Custom2", or "Custom3" corresponding to the projection screen size in Step S200. The user can refer to an instruction manual or the like to check projection screen sizes corresponding to the preset button "Custom1", "Custom2", and "Custom3".

Figure 11:
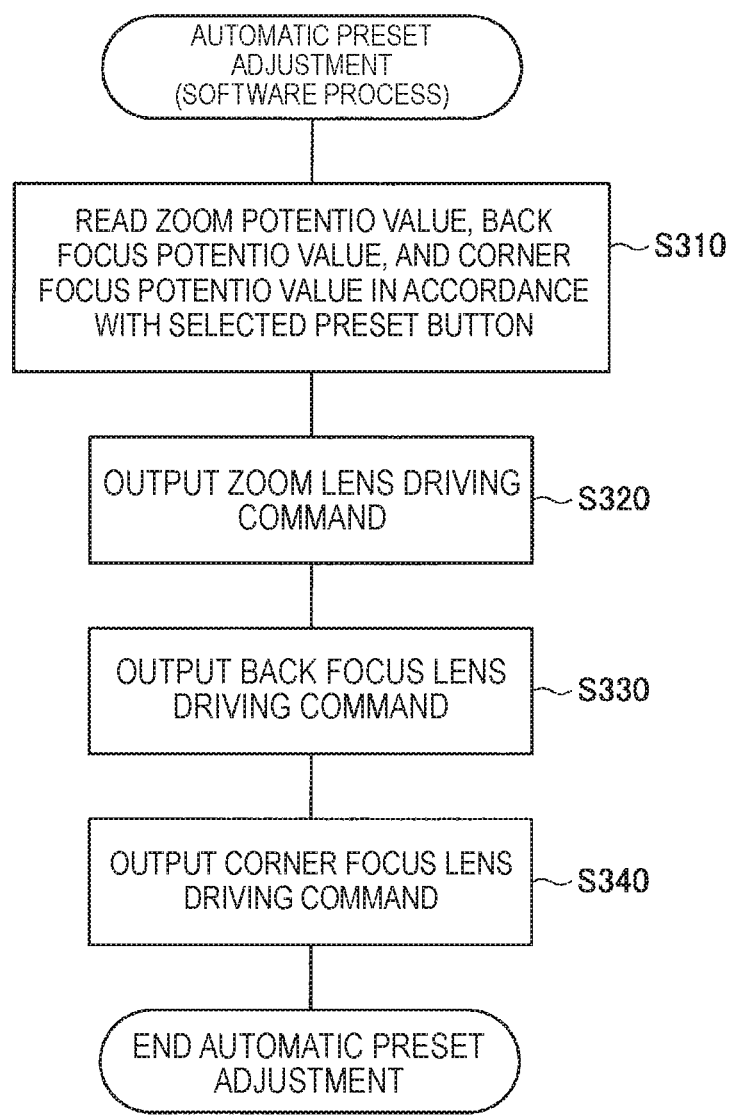
FIG. 11 is a flowchart illustrating an example of an automatic preset adjustment process performed by a display processing device.

Next, in Step S300, the display processing device 200 carries out automatic preset adjustment of the zoom, the back focus, and the corner focus in accordance with the selected preset button "Custom1", "Custom2", or "Custom3". FIG. 11 is a flowchart illustrating an example of the automatic preset adjustment. When carrying out the automatic preset adjustment, the display processing device 200 first reads a zoom potentio value, a back focus potentio value, and a corner focus potentio value that are corresponding to the selected preset button, in Step S310. Next, in Steps S320 to S340, the display processing device 200 outputs driving commands for the zoom lens driving circuit 50c, the back focus lens driving circuit 50a, and the corner focus lens driving circuit 50b to move positions of the lenses to the potentio value read in Step S310. Accordingly, the automatic preset adjustment is completed.

Figure 12:
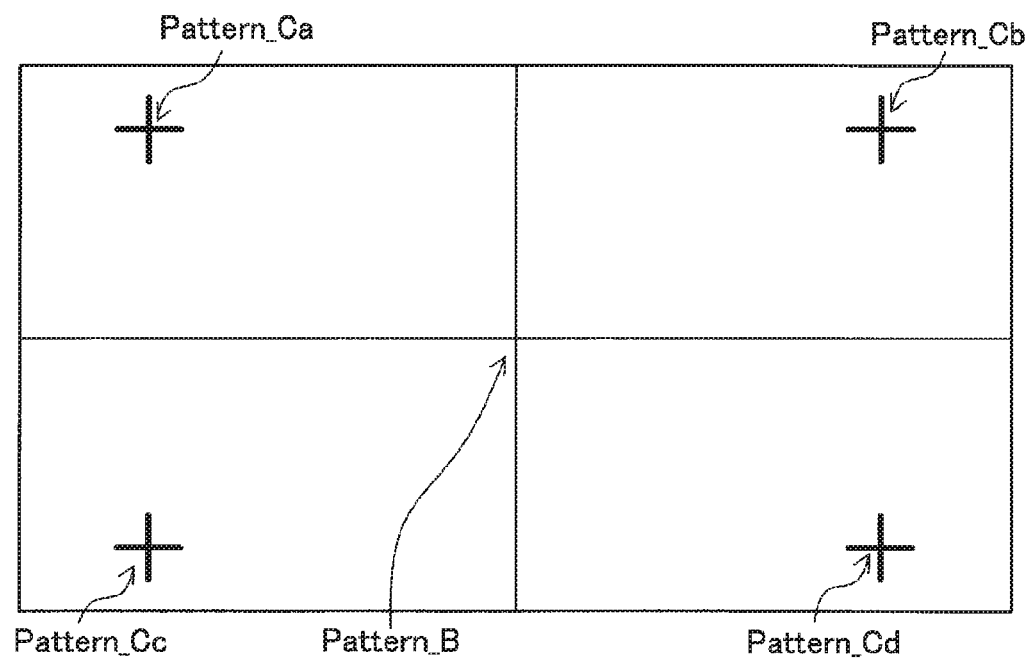
FIG. 12 is an explanatory diagram illustrating an example of a pattern screen.

With reference to FIG. 7 again, after the automatic preset adjustment is carried out, when the user presses the image quality adjustment pattern display button "Pattern" in Step S400, the display processing device 200 projects a pattern screen on the projection surface SCR in Step S500. FIG. 12 illustrates an example of the pattern screen. When adjusting the image quality, the back focus and the corner focus are adjusted, and thereby the pattern screen has a pattern "Pattern_B" that is a pattern for adjusting the back focus in the central area of the screen. In addition, the pattern screen includes patterns "Pattern_Ca", "Pattern_Cb", "Pattern_Cc", and "Pattern_Cd" for adjusting the corner focuses in respective corner areas of the screen. When adjusting the focuses, the focuses are adjusted so as to focus on the cross patterns.

Next, in Step S600, the user decides whether or not to adjust the projection image size. In the case where the user does not press the Zoom button (NO in S600), the procedure directly proceeds to Step S800. On the other hand, in the case where the user has pressed the Zoom button (YES in S660), the display processing device 200 outputs a driving command for the zoom lens driving circuit 50c in accordance with an arrow button operation performed by the user to move the position of the zoom lens 14 in Step S700. When the adjustment of the projection screen size is completed, the user presses an OK button.

Next, in Step S800, the user decides whether or not to adjust the back focus of the projection image. In the case where the user does not press the Focus button (NO in S800), the procedure directly proceeds to Step S1100. On the other hand, in the case where the user has pressed the Focus button (YES in S800), the display processing device 200 carries out the automatic adjustment process on the back focus in Step S900.

Figure 13:
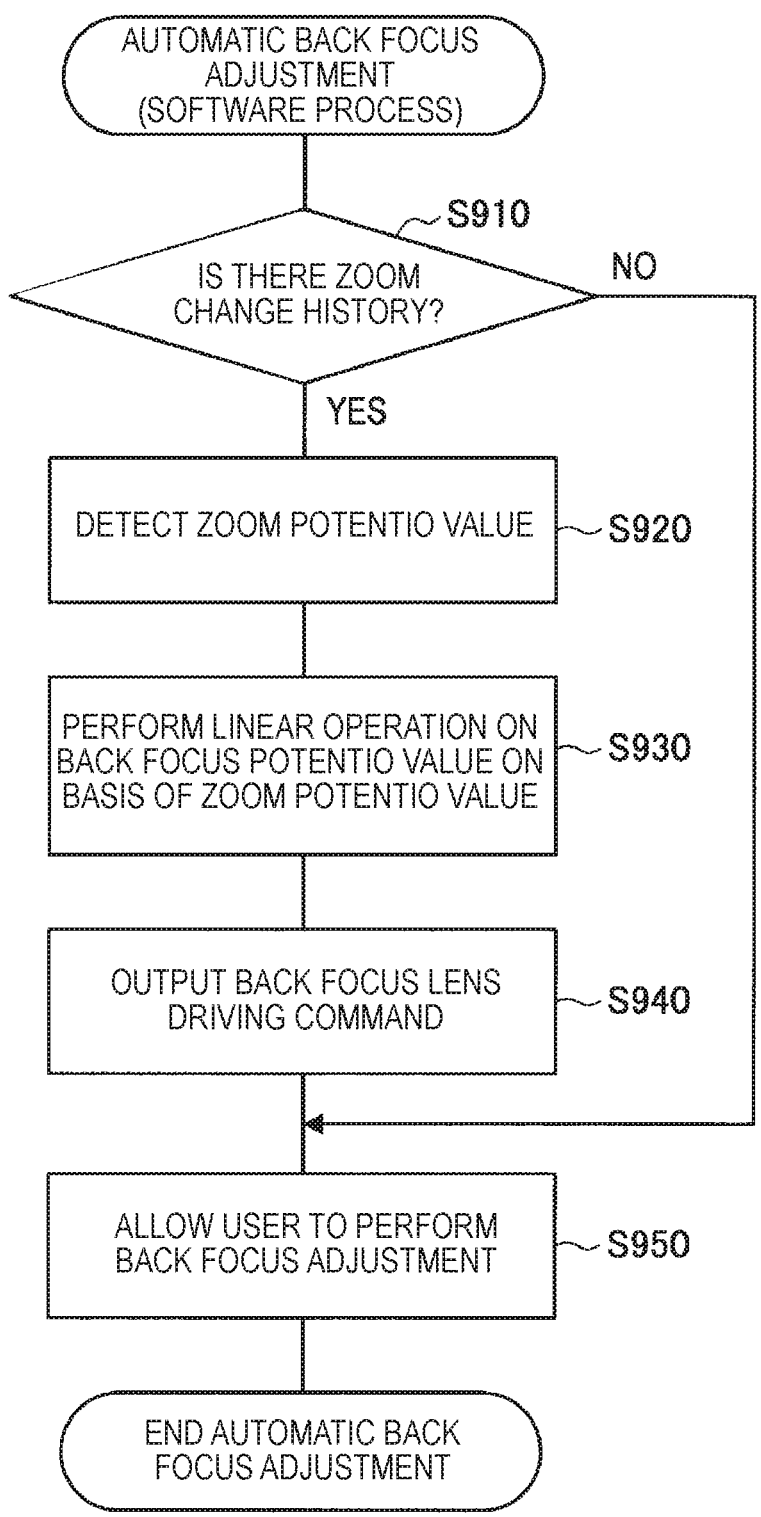
FIG. 13 is a flowchart illustrating an example of an automatic back focus adjustment process performed by a display processing device.

FIG. 13 is a flowchart illustrating an example of the automatic back focus adjustment process. When carrying out the automatic back focus adjustment, the display processing device 200 first determines whether or not the position of the zoom lens 14 has been changed in Step S910. In the case where the short focus projector device 100 is installed for the first time, the display processing device 200 determines that the position of the zoom lens 14 is changed. In the case where there is a zoom change history (YES in S910), the display processing device 200 detects a current zoom potentio value in Step S920. Next, in Step S930, the display processing device 200 performs linear operation on the back focus potentio value on the basis of the detected zoom potentio value by using a relation between zoom potentio values and back focus potentio values illustrated in FIG. 6.

Next, in Step S940, the display processing device 200 outputs a driving command for the back focus lens driving circuit 50a to move the back focus lens 16 to a position of the calculated back focus potentio value. After outputting the driving command for the back focus lens driving circuit 50a, the display processing device 200 allowed the user to perform a back focus adjustment in Step S950. On the other hand, in the case where there is no zoom change history (NO in S910) in the previous step S910, the procedure directly proceeds to Step S950, and the display processing device 200 allows the user to perform the back focus adjustment. In this way, the automatic back focus adjustment process is completed.

After the automatic back focus adjustment process is completed, the user operates arrow buttons as necessary to further adjust the back focus in Step S1000. At this time, the display processing device 200 outputs a driving command for the back focus lens driving circuit 50a in accordance with the arrow button operation performed by the user to move the position of the back focus lens 16. When the back focus adjustment is completed, the user presses the OK button.

Next, in Step S1100, the user decides whether or not to adjust the corner focuses of the projection image. In the case where the user does not press the Corner Correction button (NO in S1100), the procedure directly proceeds to Step S1300. On the other hand, in the case where the user has pressed the Corner Correction button (YES in S1100), the display processing device 200 outputs a driving command for the corner focus lens driving circuit 50b in accordance with an arrow button operation performed by the user to move the position of the corner focus lens 12 in Step S1200. When the corner focus adjustment is completed, the user presses the OK button.

Figure 14:
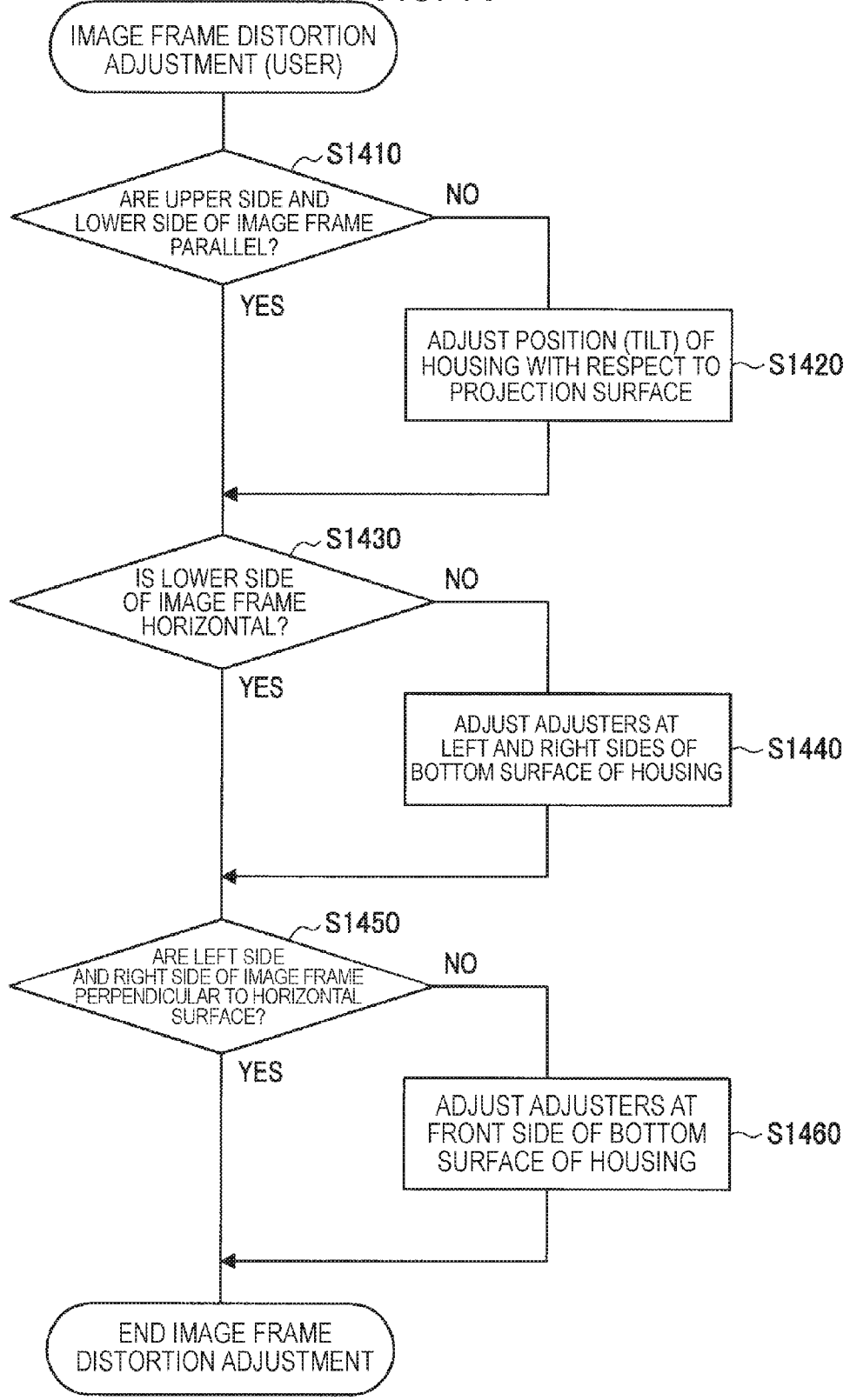
FIG. 14 is a flowchart illustrating an example of a procedure performed by a user to adjust image frame distortion.
Figure 15:
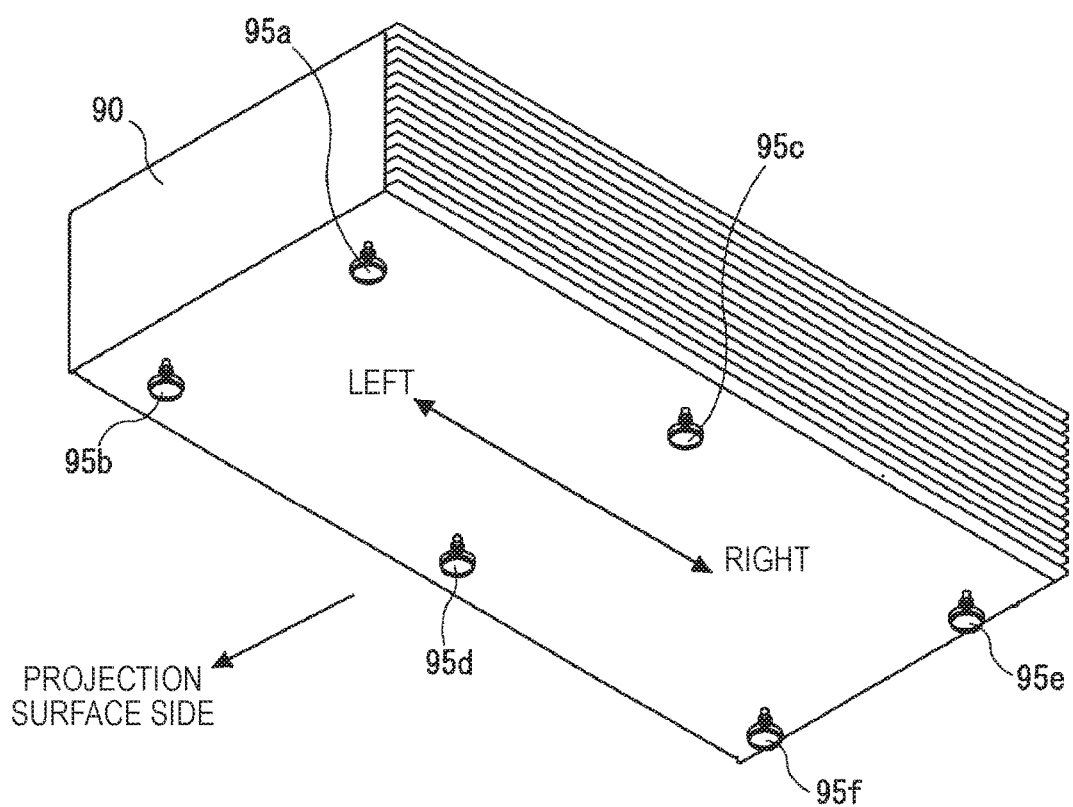
FIG. 15 is an explanatory diagram illustrating adjusters on a bottom surface of a housing.

Next, in Step S1300, the user determines whether or not the image frame of the projection image projected on the projection surface SCR is distorted. In the case where the image frame has been determined to be distorted (No in S1300), the procedure proceeds to Step S1400, and the user adjusts the distorted image frame by changing the physical installation state of the short focus projector device 100. FIG. 14 is a flowchart illustrating an image frame distortion adjustment performed by a user. When carrying out the distortion adjustment, first, the user determines whether or not an upper side and a lower side of the image frame are parallel in Step S1410. In the case where the upper side and the lower side of the image frame are parallel (YES in S1410), the procedure directly proceeds to Step S1430. On the other hand, in the case where the upper side and the lower side of the image frame are not parallel (NO in S1410), the user adjust the tilt of the short focus projector device 100 with respect to the projection surface SCR in Step S1420. In other words, as illustrated in FIG. 15, the user adjusts the distance between the projection surface SCR and the right side end or the left side end of the housing 90 to make the upper side and the lower side of the image frame parallel.

Next, in Step S1430, the user determines whether or not the lower side of the image frame is horizontal. In the case where the lower side of the image frame is horizontal (YES in S1430), the procedure directly proceeds to Step S1450. On the other hand, in the case where the lower side of the image frame is not horizontal (NO in S1430), the user adjusts the tilt of the short focus projector device 100 to the right and left with respect to the horizontal surface in Step S1440. In other words, as illustrated in FIG. 15, the user appropriately adjusts the height of the adjusters 95a and 95b at the left side and the adjusters 95e and 95f at the right side among the adjusters 95a to 95f on the bottom surface of the housing 90 to make the lower side of the image frame horizontal.

Next, in Step S1450, the user determines whether or not the left side and the right side of the image frame are perpendicular to the horizontal surface. In the case where the left side and the right side of the image frame are perpendicular to the horizontal surface (YES in S1450), the image frame distortion adjustment ends. On the other hand, in the case where the left side and the right side of the image frame are not perpendicular to the horizontal surface (NO in S1430), the user adjusts the tilt of the short focus projector device 100 to the back and forth with respect to the horizontal surface in Step S1460. In other words, as illustrated in FIG. 15, the user appropriately adjusts the height of the adjusters (tilting adjusters) 95b, 95d, and 95f at the front side (opposite to the projection surface side) among the adjusters 95a to 95f on the bottom surface of the housing 90 to make the left and right sides of the image frame perpendicular to the horizontal surface. In this way, the image frame distortion adjustment is completed.

With reference to FIG. 7 again, the projection screen size may be changed or the projection image may be out-of-focus after the image frame distortion adjustment in Step S1400 is completed. Therefore, the procedure goes back to Step S600 to repeat the operations and processes in the respective steps in the above described flowchart. In the end, the image quality adjustment is completed in the case where the user has determined that the focus state of the projection image becomes an appropriate state and there is no image frame distortion (YES in S1300) in Step S1300.

As described above, by using the short focus projector device 100 according to the present embodiment, the user can operate the remote controller 80 or the operation panel 70 to adjust not only the corner focuses but also back focus. Therefore, it is possible to adjust the focuses of the projection image in the entire screen even in the case of the short focus projector device. Since it is possible to adjust the focuses of the projection image in the entire screen, the user himself/herself can adjust the enlargement ratio of the projection image. The short focus projector device 100 according to the present embodiment can project the high quality projection image with the screen size desired by the user.

In addition, by using the short focus projector device 100 according to the present embodiment, the display processing device 200 can automatically adjust the back focus in accordance with the enlargement ratio of the projection image. Thereby, the back focus adjustment performed by the user is assisted, and the user can easily obtain the high quality projection image even in the case of using the short focus projector device 100 by which it is relatively difficult to adjust the image quality.

In the case where the zoom adjustment, the back focus adjustment, and the corner focus adjustment are carried out in accordance with the user operation, it is easy to carry out balanced adjustment on the entire screen by carrying out the zoom adjustment, the back focus adjustment, and the corner focus adjustment are carried out in this order. Therefore, the order of the zoom adjustment, the back focus adjustment, and the corner focus adjustment may be described in an instruction manual or the like to encourage the user to adjust the image quality in this order. Also in the case of the image frame distortion adjustment, it is easy to solve the distortion when the processes are performed in the order illustrated in FIG. 14. Therefore, the procedure of the distortion adjustment may be described in the instruction manual or the like to encourage the user to adjust the image quality in this order.

6. Conclusion

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above described embodiment, the center focus adjustment according to the user operation is allowed after the automatic center focus adjustment performed by the back focus control unit 200a. However, the order of processes is not limited thereto. The center focus adjustment according to the user operation may be separated from the automatic adjustment performed by the back focus control unit 200a, and may be carried out independently.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

A display processing device including
a focus control unit configured to be capable of adjusting a focal length in at least a central area of a projection image in accordance with a user operation, the projection image being enlarged and projected from a projection optical system capable of setting the focal length of the projection image at a short range.

(2)

The display processing device according to (1),
wherein the focus control unit is capable of performing automatic adjustment on the focal length in at least the central area in accordance with an enlargement ratio of the projection image.

(3)

The display processing device according to (2),
wherein the focus control unit finds the focal length according to the set enlargement ratio of the projection image by linear operation and performs the automatic adjustment, on the basis of the focal length in at least the central area corresponding to at least two reference enlargement ratios of the projection image that are stored in advance.

(4)

The display processing device according to (3),
wherein the focus control unit allows adjustment of the focal length in at least the central area according to the user operation, after the automatic adjustment of the focal length in at least the central area.

(5)

The display processing device according to any one of (2) to (4), wherein the focus control unit performs the automatic adjustment on the focal length in at least the central area in a case where the enlargement ratio of the projection image has been changed.

(6)

The display processing device according to any one of (1) to (5), wherein, when the focus control unit is a back focus control unit, the display processing device further includes a corner focus control unit configured to be capable of controlling a focal length in a corner area of the projection image in accordance with the user operation.

(7)

The display processing device according to (6), wherein the back focus control unit adjusts a lens position of a back focus lens that is different from a corner focus lens for adjusting the focal length in the corner area of the projection image.

(8)

The display processing device according to (6) or (7), wherein the corner focus control unit adjusts a lens position of the corner focus lens.

(9)

The display processing device according to any one of (1) to (8), further including a zoom control unit configured to be capable of controlling an enlargement ratio of the projection image in accordance with the user operation.

(10)

The display processing device according to any one of (1) to (9), wherein, when the focus control unit is a back focus control unit, the display processing device includes:

a corner focus control unit configured to be capable of adjusting a focal length in a corner area of the projection image; and a zoom control unit configured to be capable of adjusting an enlargement ratio of the projection image, wherein at least one preset value group is set in advance, the one preset value group storing the focal length in at least the central area, the focal length in the corner area, and the enlargement ratio in association with each other, and the back focus control unit, the corner focus control unit, and the zoom control unit perform automatic adjustment on the focal length in at least the central area, the focal length in the corner area, and the enlargement ratio, in accordance with a preset value group selected by a user.

(11)

A projection type image display device including:

a light source;

an illumination optical system configured to uniformly radiate light flux from the light source to a surface of an image modulation element serving as a primary image surface;

a projection optical system configured to be capable of setting a focal length of a projection image at a short range, and configured to enlarge and project image information of the primary image surface modulated by the image modulation element on a projection surface serving as a secondary image surface; and a focus control unit configured to be capable of adjusting a focal length in at least a central area of the projection image in accordance with a user operation.

REFERENCE SIGNS LIST

10 projection optical system
12 corner focus lens
14 zoom lens
16 back focus lens
30 illumination optical system
40 light source
50 driver circuit
50*a* back focus lens driving circuit
50*b* corner focus lens driving circuit
50*c* zoom lens circuit
60 storage unit
70 operation panel
80 remote controller
90 housing
100 short focus projector device (projection type image display device)
200 display processing device
200*a* back focus control unit
200*b* corner focus control unit
200*c* zoom control unit

The invention claimed is:

1. A display processing device, comprising:
a back focus control unit configured to adjust a focal length in at least a central area of a projection image based on a user operation,
wherein the projection image is enlarged and projected from a projection optical system that sets the focal length of the projection image at a short range.

2. The display processing device according to claim 1,
wherein the back focus control unit is further configured to automatically adjust the focal length in at least the central area based on an enlargement ratio of the projection image.

3. The display processing device according to claim 2,
wherein the back focus control unit is further configured to:
determine the focal length based on the enlargement ratio of the projection image by linear operation; and
automatically adjust the focal length based on a reference focal length in at least the central area corresponding to at least two reference enlargement ratios of the projection image, wherein the at least two reference enlargement ratios of the projection image are stored in advance.

4. The display processing device according to claim 3,
wherein, after the automatic adjustment of the focal length in at least the central area, the back focus control unit is further configured to enable the adjustment of the focal length in at least the central area based on the user operation.

5. The display processing device according to claim 2,
wherein the back focus control unit is further configured to automatically adjust the focal length in at least the central area based on change in the enlargement ratio of the projection image.

6. The display processing device according to claim 1,
further comprising a corner focus control unit configured to control a focal length in a corner area of the projection image based on the user operation.

7. The display processing device according to claim 6,
wherein the back focus control unit is further configured to adjust a lens position of a back focus lens for adjustment of the focal length in the corner area of the projection image, and wherein the back focus lens is different from a corner focus lens.

8. The display processing device according to claim 6, wherein the corner focus control unit is further configured to adjust a lens position of a corner focus lens for adjustment of the focal length in the corner area of the projection image.

9. The display processing device according to claim 1, further comprising a zoom control unit configured to control an enlargement ratio of the projection image based on the user operation.

10. The display processing device according to claim 1, further comprising:
   a corner focus control unit configured to adjust a focal length in a corner area of the projection image; and
   a zoom control unit configured to adjust an enlargement ratio of the projection image, wherein
   at least one preset value group is set in advance,
   wherein the at least one preset value group stores the focal length in at least the central area, the focal length in the corner area, and the enlargement ratio, and
   wherein the back focus control unit is further configured to automatically adjust the focal length in at least the central area based on a first preset value group selected by a user from the at least one preset value group, the corner focus control unit is further configured to automatically adjust the focal length in the corner area based on the first preset value group selected by the user, and the zoom control unit is further configured to automatically adjust the enlargement ratio based on the first preset value group selected by the user.

11. A projection type image display device, comprising:
   a light source;
   an illumination optical system configured to uniformly radiate light flux from the light source to a surface of an image modulation element that serves as a primary image surface;
   a projection optical system configured to:
      set a focal length of a projection image at a short range; and
      enlarge and project image information of the primary image surface on a projection surface that serves as a secondary image surface; and
   a back focus control unit configured to adjust the focal length in at least a central area of the projection image based on a user operation.

* * * * *